H. GREASON.
COMBINATION COVER AND DISH DRAINER.
APPLICATION FILED MAR. 30, 1911.
1,001,520.
Patented Aug. 22, 1911.
3 SHEETS—SHEET 1.
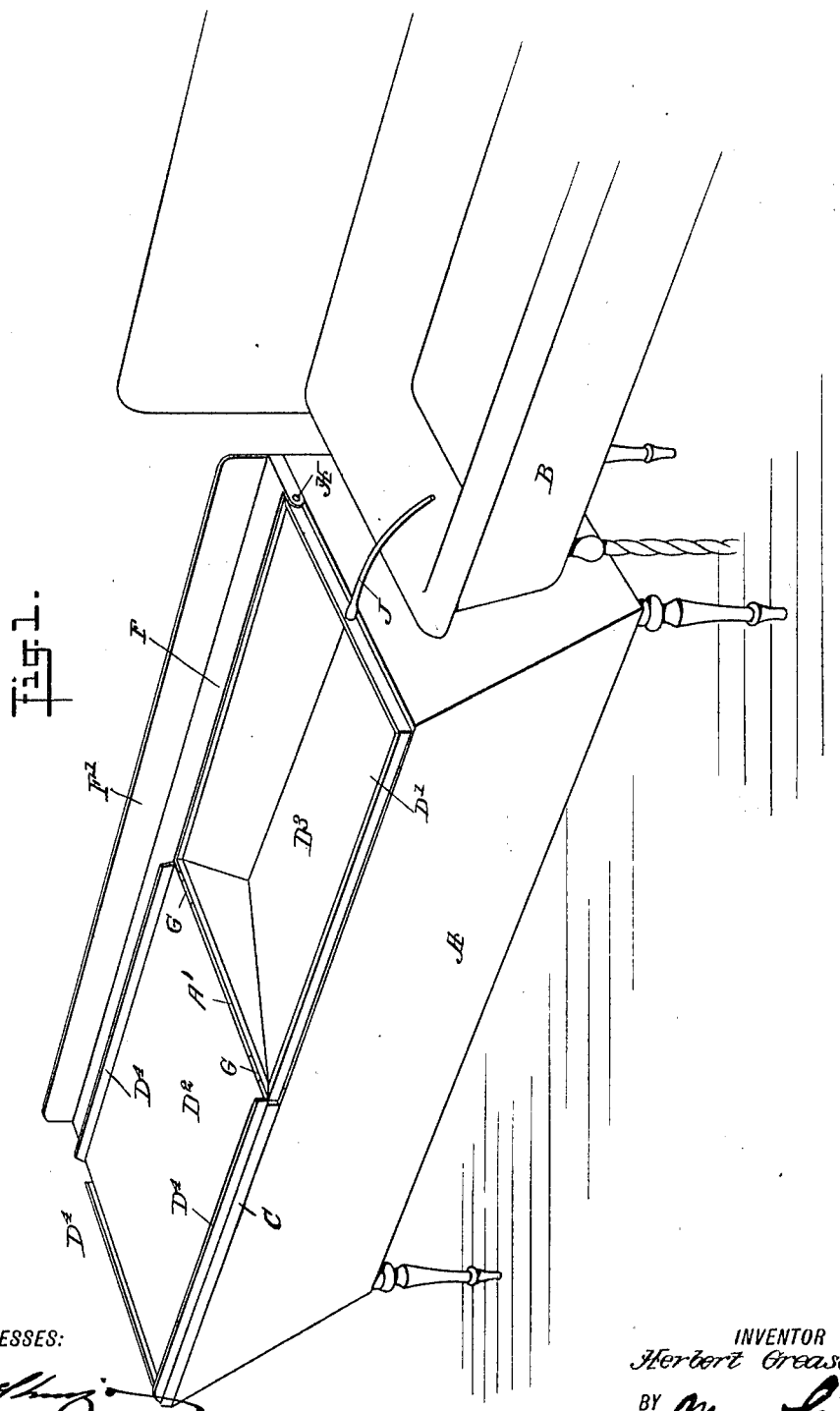
WITNESSES:
INVENTOR
Herbert Greason
BY
ATTORNEYS

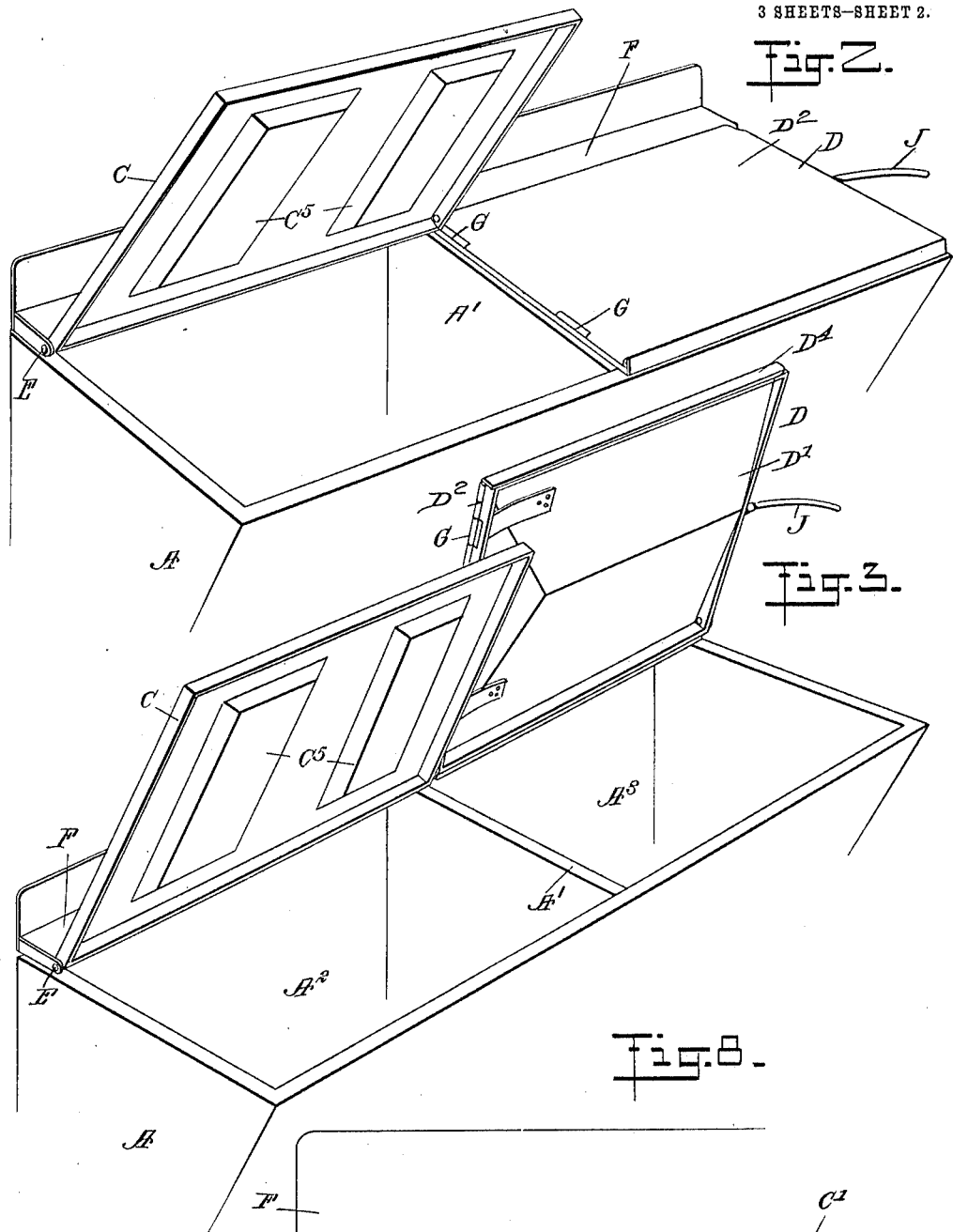

H. GREASON.
COMBINATION COVER AND DISH DRAINER.
APPLICATION FILED MAR. 30, 1911.
1,001,520.
Patented Aug. 22, 1911.
3 SHEETS—SHEET 3.
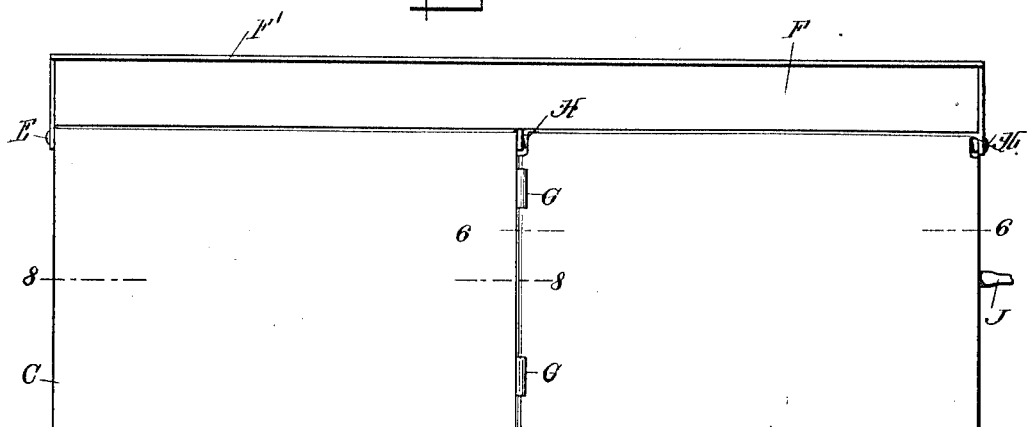
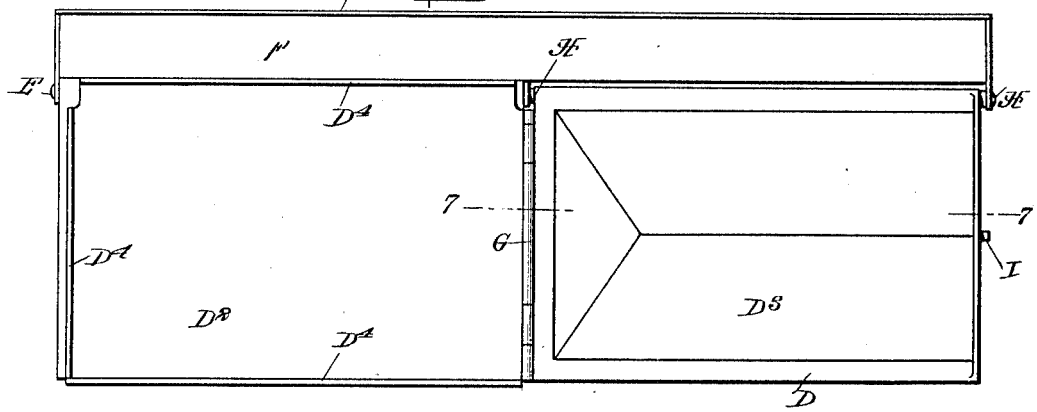
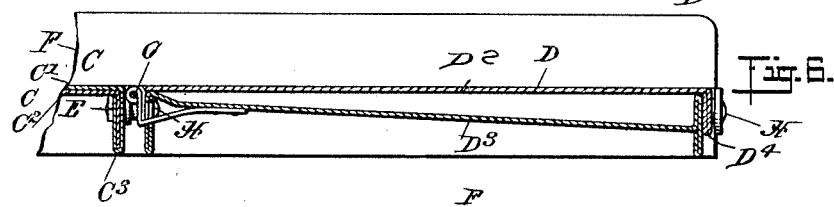
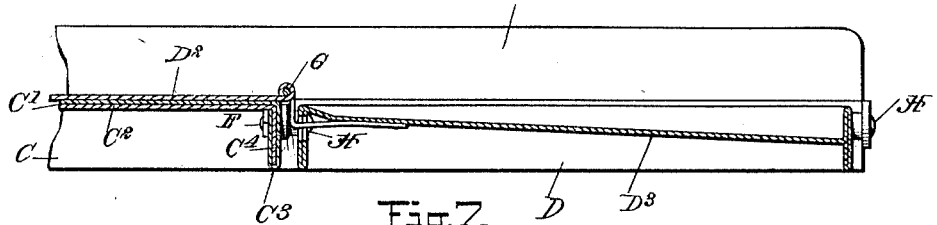
WITNESSES:
INVENTOR
Herbert Greason
BY
ATTORNEYS

UNITED STATES PATENT OFFICE.

HERBERT GREASON, OF RIDGEWOOD, NEW JERSEY.

COMBINATION COVER AND DISH-DRAINER.

1,001,520.  Specification of Letters Patent.  Patented Aug. 22, 1911.

Application filed March 30, 1911. Serial No. 617,829.

*To all whom it may concern:*

Be it known that I, HERBERT GREASON, a citizen of the United States, and a resident of Ridgewood, in the county of Bergen and State of New Jersey, have invented a new and Improved Combination Cover and Dish-Drainer, of which the following is a full, clear, and exact description.

The object of the invention is to provide a new and improved combination cover and dish drainer, more especially designed for use on wash tubs located alongside the sink or a similar receptacle, the device being arranged to permit its use as a cover for the wash tub or as a drainer for dishes. In order to accomplish the desired result, the combination cover and drainer is made in two sections hinged together at one end and normally overlying one the other to allow of swinging the upper section to one side of the lower section, the latter being provided with a draining bottom, connected at its lower end with a discharge spout for discharging the drainage water to the adjacent sink or other receptacle.

A practical embodiment of the invention is represented in the accompanying drawings forming a part of this specification, in which similar characters of reference indicate corresponding parts in all the views.

Figure 1 is a perspective view of the combination cover and dish drainer as applied and with the parts in position for draining dishes; Fig. 2 is a perspective view of the combination cover and dish drainer in position for use as covers on the wash tubs, one of the covers being partly open; Fig. 3 is a similar view of the same showing both covers partly open; Fig. 4 is a plan view of the combination cover and dish drainer; Fig. 5 is a similar view of the same with the parts in position for draining dishes; Fig. 6 is an enlarged sectional side elevation of the combined cover and dish drainer on the line 6—6 of Fig. 4; Fig. 7 is a similar view of the same on the line 7—7 of Fig. 5; and Fig. 8 is a like view of the same on the line 8—8 of Fig. 4.

The combination cover and dish drainer is shown applied to a wash tub A, located adjacent to a sink B, and provided with a transverse partition A' to form two compartments $A^2$, $A^3$, adapted to be closed at the top by covers C and D, of which the cover C is connected at its rear by pivots E with a back rail F, so as to permit of swinging the cover C into a closed or open position. The cover D is made in two sections D' and $D^2$, connected with each other at the end adjacent to the cover C by a hinge G, so as to permit of swinging the upper section $D^2$ into an open position and over onto the cover C, as plainly indicated in Figs. 1 and 5, to permit of using the lower section D' as a dish drainer, while the section $D^2$ is used as a temporary dish rack. The bottom of the lower section D' of the cover D is connected at its rear end by pivots H with the back rail F, so that when the section $D^2$ is folded upon the section D' then the whole cover with the sections in folded position can be swung rearward into an open position for gaining access to the compartment $A^3$ of the wash tub A when the latter is used for washing purposes.

It is understood that normally the covers C and D are in closed position to cover the compartments $A^2$ and $A^3$, and when it is desired to use the wash tub A for washing purposes then the covers C and D are swung rearward into open position. When it is desired to use the device as a dish drainer then the section $D^2$ is swung into an open position onto the top of the closed cover C, as plainly indicated in Figs. 1, 5 and 7. For the purpose mentioned, the bottom $D^3$ of the lower section D' is inclined from the left or hinge end of the section to the right-hand end thereof, and is also inclined from the front to the middle and from the rear to the middle, and the lower end of the bottom $D^3$ is connected with an outlet spout I adapted to receive at its outer end a tube J extending into the sink B (see Fig. 1), so that the drainage water from the dishes placed onto the section D' readily flows down the bottom $D^3$ through the spout I and the tube J into the sink B.

The cover section D' is provided with a marginal flange to give the desired strength to the section D'. The upper section $D^2$ is provided at its sides and the free end with depending flanges $D^4$ forming guard rails for the dishes placed on the section $D^2$ for drying purposes, the said flanges fitting over the corresponding flanges of the section D' at the time the section $D^2$ is in a closed position and overlies the section D'.

The covers C and D as well as the back rail F are preferably made of sheet metal and the cover C is preferably made of a top sheet C' and a bottom sheet $C^2$, the top sheet C' being provided at the ends and sides with depending doubled-up flanges $C^3$ between the members of which extend flanges $C^4$ depending from the sheet $C^2$, as will be readily understood by reference to Fig. 8. The sheet $C^2$ is also provided with stamped or corrugated portions $C^5$ to reinforce the cover C and thus render the same exceedingly strong and durable. The back rail F is preferably provided with an upwardly-extending flange F'.

Having thus described my invention, I claim as new and desire to secure by Letters Patent:—

1. A combination cover and dish drainer, comprising a cover made in two sections hinged together at one end and normally one overlying the other, the lower section having a drainage bottom, and an outlet leading from the lower end of the said bottom.

2. A combination cover and dish drainer, comprising a cover made in two sections, hinged together at one end normally one overlying the other, the lower section having a drainage bottom, and an outlet leading from the lower end of the said bottom, and the upper section having flanges at the sides and on the free end to form a rack when the said upper section is in open position, the said flanges being arranged to inclose the corresponding sides and end of the lower section when the said upper section is in closed position.

3. A combination cover and dish drainer, comprising a back rail, a plurality of covers arranged one alongside the other, one of the covers being made in sections hinged together at the end adjacent the other cover, the said cover sections normally overlying one the other and the lower cover section and the other cover being hinged at their rear to the said back rail and the said lower section having a drainage bottom, the upper section being adapted to swing over onto the other cover to rest thereon and to form a temporary dish rack.

In testimony whereof I have signed my name to this specification in the presence of two subscribing witnesses.

HERBERT GREASON.

Witnesses:
ROBERT OTTO KAFF,
SAMUEL L. GREASON.

Copies of this patent may be obtained for five cents each, by addressing the "Commissioner of Patents, Washington, D. C."